2,873,241
PROCESS FOR IMPROVING THE ADHESIVENESS OF LACQUERS AND PRINTING COLOURS ON POLYETHYLENE PRODUCTS

Anton Strzyzewski and Willi Geilenkirchen, Krefeld, Germany

No Drawing. Application March 13, 1956
Serial No. 571,150

Claims priority, application Germany March 23, 1955

10 Claims. (Cl. 204—163)

It is known that coatings, paints and prints adhere very unsatisfactorily or not at all to the surface of products made of polyethylene and its copolymers containing substantial proportions of polyethylene. It is true that the unsatisfactory anchorage varies with the individual lacquers, printing colours and the like. To coatings produced, for example, by the drying of solutions of polyesters containing hydroxyl groups with the addition of polyisocyanates, a relatively good anchorage is ascribed. However, film-formers which are generally employed for coatings or printing colours such as cellulose derivatives, particularly nitrocellulose, drying oils or alkyd resins, could hitherto not be applied to polyethylene surfaces with satisfactory anchorage.

Attempts have been made to overcome the difficulties by heating the polyethylene surfaces, with simultaneous cooling, if necessary, of the lower layers. Another method consists in providing the printed surfaces with thin transparent protective films of silicone oils or silicone waxes. Further it has been proposed to treat the surfaces of articles of polyethylene with gaseous chlorine or with nitrogen oxides or with mixtures of ozone with halogen and hydrogen halides or mixtures of ozone and nitrogen oxides, particularly in combination with irradiating the surfaces with ultra violet, prior to the printing. Good results however are obtained only at elevated temperatures, generally from about 150 to 300° C.

It has now been found that coatings, paints and prints produced from the usual film-forming substances adhere very satisfactorily to the surfaces of products of polyethylene and its copolymers such as films, foils, sheets, containers or bottles by treating the surfaces with chlorinated hydrocarbons and irradiating with ultra-violet light prior to the application of the coatings.

Among the products of polyethylene-copolymers which may be treated according to the invention besides of such of polyethylene itself there may be mentioned for example such of interpolymers of ethylene with isobutylene, styrene, vinylchloride or vinylacetate.

Chlorinated hydrocarbons suitable for the process of the invention are, for example, mono-, di- and trichlormethane, mono-, di-, tri-, tetra-, penta- and hexachlorethane, di-, tri- and tetrachlorethylene, mono-, di- and trichlorpropane, dichlorpropylene, mono- and dichlorpentane, mono-, di-, tri-, tetra-, penta- and hexachlorobenzene, the chlorotoluenes, the chloronaphthalenes, also fluorine containing chlorinated hydrocarbons such as 1,1-tetrafluorodichlorethane and trifluoromonochlorethane.

The surfaces to be treated may first be moistened with a chlorinated hydrocarbon and then irradiated.

According to the invention, it is also possible to use, for example, the vapours of chlorinated hydrocarbons per se or diluted with inert gases such as air or carbon dioxide or nitrogen, the last being of special advantage. A stream of nitrogen may, for instance, be passed through tri- or perchlorethylene at room or elevated temperature and the surfaces of the products of polyethylene may then be treated with the gas containing chlorinated hydrocarbon vapour, for example, 10 grams of chlorinated hydrocarbon per 100 litres of gas.

The period of action of the chlorinated hydrocarbon vapours, or mixtures thereof with inert gases, may be very brief. It depends inter alia on the temperature of the vapours, which may vary between about 0 and about 75° C., preferably between about 20 and about 60° C. At room temperature the action will in general take half a minute to five minutes, and at temperatures above 50° C. a few seconds only. It is often advantageous to heat the foil very slightly.

In most cases, the action of chlorinated hydrocarbons may be further increased by admixing small quantities of free halogens, e. g. fluorine, chlorine or bromine. Such additives further reduce the required application time of the vapours.

A mercury vapour lamp may serve as a source for the ultra-violet rays. At a distance of 40 to 70 centimetres between the source of light and the surface to be treated an irradiation of one to five minutes is, in general, sufficient so that continuous working is possible, if desired.

If thick-walled articles are not concerned, but rather foils or films, it is surprisingly also possible to treat one side of the polyethylene product with vapours of chlorinated hydrocarbons and to expose at the same time the other side of the action of ultra-violet light. It is thus possible to pass a foil of polyethylene through a channel containing liquid perchlorethylene in such a manner that the foil comes into contact with the vapours and to irradiate it at the same time with ultra-violet light from above. After this treatment there may be applied to both sides of the foil a reliably adhesive lacquer or print. It is also possible to pass through a tube of polyethylene a mixture of air or nitrogen and perchlorethylene vapour at a slight pressure and to irradiate the tube at the same time with ultra-violet light from outside. After a brief treatment the external surface may be printed.

Finally, the chlorinated hydrocarbons may be added in many cases to the lacquers or printing colours so that a special pre-treatment of the articles is not required.

The treatment according to the invention does not involve any visible or otherwise detrimental changes of the polyethylene surfaces. All usual film-formers, such as nitrocellulose-, oil-, or alkyd resin films, completely adhere, after drying, to the polyethylene surfaces to the extent that they cannot be torn off by adhesive tapes which have been pressed onto them and then stripped off.

The following examples are given for the purpose of illustrating the invention, the parts being by weight and the temperatures in degrees centigrade.

Example 1

Foils of polyethylene, 0.05 to 0.1 millimetre thick, are moistened on one side with perchloroethylene and placed under a mercury vapour lamp at a distance of 40 centimetres for 1–2 minutes. The surfaces thus treated are then coated or printed with the following lacquers.

(a) The lacquer consists of 10 parts of moist, moderately viscous, nitrocellulose, 12.5 parts of ricinenic oil alkyd resin, 0.8 part of dibutyl-phthalate, 0.8 part of benzylbutyl-phthalate, 21 parts of butyl acetate, 19.5 parts of xylene, 32 parts of toluene, 2.5 parts of butanol and 4 parts of an organic pigment.

(b) Another lacquer consists of 100 parts of a soya bean oil alkyd resin dissolved in xylene (1:1), 2 parts of a solution of cobalt-lead-manganese naphthenate in xylene (1:2) optionally diluted with a mixture of benzine and xylene (1:1) and coloured with a soluble organic dyestuff.

(c) A third lacquer consists of 160 parts of a 64 percent solution of linseed oil alkyd resin in benzine and turpentine (8:2), 4 parts of a solution of cobalt-lead-manganese naphthenate in xylene (1:2), 20 parts of zinc green, 2 parts of Hansa yellow, 4 parts of titanium dioxide and 1 part of a 1 percent solution of silicone oil in xylene.

All coats of prints produced with these lacquers strongly adhere after drying to the polyethylene foils pretreated according to the invention.

(d) A fourth lacquer consists of 10 parts of cyclohexanone resin, 68.2 parts of ethyl alcohol, 10 parts of acetone, 3 parts of dibutyl-phthalate, 8.7 parts of ethyl cellulose and 10 parts of a basic dyestuff.

(e) A printing colour consisting of 375 parts of a binding agent, obtained by boiling a mixture of 300 parts of a moderately viscous linseed stand oil with 7.5 parts of a xylene-formaldehyde resin modified colophony ester, 25–35 parts of an organic pigment, 3–5.4 parts of cobalt-lead-manganese naphthenate (solid) and 2.25–4.5 parts of a skin preventive.

Example 2

A foil of polyethylene having a thickness of 50 microns is treated with a stream of air from below, loaded with trichlorethylene vapour by passing the air through liquid perchlorethylene at room temperature and subsequently heating it to 50° C. The action of this airvapour stream on the foil lasts a quarter to half a minute. The foil is irradiated from above with ultra-violet light at the same time. After this treatment the lacquers and printing colours strongly adhere, particularly to that side which has been exposed to irradiation.

Example 3

A tube of polyethylene having a wall thickness of 70 microns is charged at a slight pressure with a stream of nitrogen containing perchlorethylene. The tube inflated in this manner is externally irradiated at the same time with ultra-violet light. After 2 minutes of irradiation, lacquers or printing colours applied to the surface adhere satisfactorily.

Example 4

The underside of a foil of polyethylene having a thickness of 30 microns is treated from below with a mixture consisting of nitrogen and perchlorethylene vapour and irradiated at the same time from below with ultra-violet light. The temperature of the foil is about 60°. An extremely good adhesiveness of the side of the foil thus treated is obtained after 15 to 25 seconds.

Example 5

The underside of a foil of an interpolymer of ethylene and styrene having a temperature of 40° C., and a thickness of 40 microns, is treated from below with a gaseous mixture of nitrogen, perchlorethylene, trifluoromonochlorethane and chlorine (100 litres containing about 5 grams of perchlorethylene, 5 grams of trifluoromonochlorethane and about 4 grams of chlorine) and irradiated at the same time from above with ultra-violet light during 15 seconds. A very good adhesiveness of lacquers and printings is obtained at both sides of the foil.

Example 6

The surface of a bottle of polyethylene, having a temperature of 50° C., is printed with a solution of linseeed oil varnish in perchlorethylene 1:1 containing a dyestuff, for example "Sudanorange." Then the surface is irradiated with ultra-violet light during 2 minutes. The printed design has a good adhesive.

Example 7

A film of an interpolymer of ethylene and isobutylene, having a temperature of 50° C., is treated in the same manner as described in Example 6 by a 10 percent solution of chlorinated rubber in perchlorethylene with a content of 5 percent of a solution of chlorodiphenyl in xylene 1:1 and some percent of a dyestuff, for example "Sudanrot."

We claim:

1. The process of improving lacquer and printing color adhesion to polyethylene which comprises contacting the surface of a polyethylene product at a temperature of from about 0 to about 75° C. with a chlorinated hydrocarbon containing a total of up to about 10 carbon atoms and a total of up to about 6 chlorine substituents while simultaneously irradiating said surface with ultra-violet light.

2. The process of claim 1 wherein the chlorinated hydrocarbon is liquid and the surface is wetted with said chlorinated hydrocarbon prior to said irradiation with ultra-violet light.

3. The process of claim 1 wherein the surface is contacted with said chlorinated hydrocarbon in the vapor state.

4. The process of claim 3 wherein the said chlorinated hydrocarbon in the vapor state is diluted with inert gases.

5. The process of claim 4 wherein the chlorinated hydrocarbon in vapor state is at a temperature of from about 20 to about 60° C.

6. The process of claim 1 wherein the polyethylene product is heated to a temperature between about 20 and about 75° C.

7. The process of claim 1 wherein the surface is contacted with a lacquer containing said chlorinated hydrocarbon.

8. The process of improving lacquer and printing color adhesion to polyethylene which comprises contacting the surface of a polyethylene product at a temperature of from about 0 to about 75° C. with a fluorine-containing chlorinated alkane while simultaneously irradiating said surface with ultra-violet light.

9. The process of improving lacquer and printing color adhesion to polyethylene which comprises contacting the surface of a polyethylene product at a temperature of from about 0 to about 75° C. with a chlorinated hydrocarbon containing a total of up to about 10 carbon atoms and a total of up to about 6 chlorine substituents together with a small amount of free halogen while simultaneously irradiating said surface with ultra-violet light.

10. The process of improving lacquer and printing color adhesion to polyethylene which comprises contacting one side of a thin walled polyethylene product at a temperature of from about 0 to about 75° C. with a chlorinated hydrocarbon containing a total of up to about 10 carbon atoms and a total of up to about 6 chlorine substituents while simultaneously irradiating the other side of said polyethylene product with ultra-violet light.

References Cited in the file of this patent

UNITED STATES PATENTS

| | | |
|---|---|---|
| 2,183,556 | Fawcett | Dec. 19, 1939 |
| 2,422,919 | Myles et al. | June 24, 1947 |
| 2,715,075 | Wolinski | Aug. 9, 1955 |

UNITED STATES PATENT OFFICE
CERTIFICATE OF CORRECTION

Patent No. 2,873,241                                                  February 10, 1959

Anton Strzyzewski et al.

It is hereby certified that error appears in the printed specification of the above numbered patent requiring correction and that the said Letters Patent should read as corrected below.

In the grant, lines 1 to 3, for "Anton Strzyzewski and Willi Geilenkirchen, of Krefeld, Germany," read -- Anton Strzyzewski and Willi Geilenkirchen, Krefeld, Germany, assignors to Farbenfabriken Bayer Aktiengesellschaft, of Leverkusen, Germany, a corporation of Germany, -- line 12, for "Anton Strzyzewski and Willi Geilenkirchen, their heirs" read -- Farbenfabriken Bayer Aktiengesellschaft, its successors --; in the heading to the printed specification, lines 5 and 6, for "Anton Strzyzewski and Willi Geilenkirchen, Krefeld, Germany" read -- Anton Strzyzewski and Willi Geilenkirchen, Krefeld, Germany, assignors to Farbenfabriken Bayer Aktiengesellschaft, Leverkusen, Germany, a corporation of Germany --.

Signed and sealed this 16th day of June 1959.

(SEAL)
Attest:

KARL H. AXLINE
Attesting Officer

ROBERT C. WATSON
Commissioner of Patents